(12) United States Patent
Potter

(10) Patent No.: US 10,655,605 B2
(45) Date of Patent: May 19, 2020

(54) BALANCING A WIND TURBINE

(71) Applicant: Noel Richard Potter, Bountiful, UT (US)

(72) Inventor: Noel Richard Potter, Bountiful, UT (US)

(*) Notice: Subject to any disclaimer, the term of this patent is extended or adjusted under 35 U.S.C. 154(b) by 0 days.

(21) Appl. No.: 16/130,329

(22) Filed: Sep. 13, 2018

(65) Prior Publication Data
US 2019/0040845 A1  Feb. 7, 2019

Related U.S. Application Data

(63) Continuation-in-part of application No. 14/848,579, filed on Sep. 9, 2015, now abandoned.

(51) Int. Cl.
| | | |
|---|---|---|
| F03D 13/35 | (2016.01) | |
| F03D 3/00 | (2006.01) | |
| F03D 7/06 | (2006.01) | |
| F03D 3/06 | (2006.01) | |

(52) U.S. Cl.
CPC .............. F03D 13/35 (2016.05); F03D 3/005 (2013.01); F03D 3/062 (2013.01); F03D 7/06 (2013.01); *F05B 2240/211* (2013.01); *F05B 2260/964* (2013.01); *F05B 2260/966* (2013.01)

(58) Field of Classification Search
CPC ............ F05B 2260/96; F05B 2260/964; F05B 2260/966; F05B 2240/211; F03D 9/12; F03D 9/14; F03D 9/16; F03D 13/35; F03D 3/062; F03D 3/005; F03D 7/06
See application file for complete search history.

(56) References Cited

U.S. PATENT DOCUMENTS

| | | | | |
|---|---|---|---|---|
| 3,799,619 A * | 3/1974 | LaBarber | ............ | B60B 27/0005 301/5.22 |
| 3,970,409 A * | 7/1976 | Luchuk | ..................... | F03D 7/06 416/145 |
| 4,075,909 A * | 2/1978 | Deakin | ................. | F16F 15/363 464/180 |
| 5,380,156 A * | 1/1995 | Iacovino | ............... | F04D 29/662 416/144 |
| 5,593,281 A * | 1/1997 | Tai | ........................ | F04D 25/088 416/145 |
| 6,213,717 B1 * | 4/2001 | Bucher | ................. | F04D 25/088 415/119 |
| 6,827,551 B1 * | 12/2004 | Duffy | ........................ | F01D 5/16 415/119 |
| 7,220,104 B2 * | 5/2007 | Zheng | ........................ | F16F 7/10 416/145 |
| 8,984,940 B2 * | 3/2015 | Josefczyk | ............. | F16F 15/363 73/470 |

(Continued)

FOREIGN PATENT DOCUMENTS

GB   2437595 A  * 10/2007 ............. F03D 3/005

*Primary Examiner* — Ruth Ilan

(57) ABSTRACT

A method for balancing a wind turbine having a vertical axis. The method includes transmitting, via a turbine shaft, mechanical power to an alternator or generator; supporting, via a support structure, a vane shaft and the turbine shaft; and balancing the wind turbine based at least in part on freely moving objects within a hollow chamber of a balancing channel. In some cases, the support structure couples the vane shaft to the turbine shaft. In some cases, the balancing channel is coupled to the vane shaft.

15 Claims, 10 Drawing Sheets

(56) References Cited

U.S. PATENT DOCUMENTS

| | | | |
|---|---|---|---|
| 2009/0317251 A1* | 12/2009 | Tsou | F03D 3/005 |
| | | | 416/51 |
| 2010/0009835 A1* | 1/2010 | Ryu | B04B 9/14 |
| | | | 494/82 |
| 2010/0021303 A1* | 1/2010 | Nielsen | F03D 1/065 |
| | | | 416/145 |
| 2010/0310370 A1* | 12/2010 | Fenaughty | F03D 3/067 |
| | | | 416/1 |
| 2015/0211496 A1* | 7/2015 | Frydendal | F03D 80/00 |
| | | | 416/145 |

* cited by examiner

BALANCING A WIND TURBINE

CROSS-REFERENCE TO RELATED APPLICATION

This application claims the benefit of U.S. patent application Ser. No. 14/848,579, filed Sep. 9, 2015.

TECHNICAL FIELD

The present disclosure relates generally to a wind turbine balancing channel (e.g., enclosed balancing channel) or balancing tube, and more particularly, to techniques for balancing a wind turbine device.

BACKGROUND

A wind turbine may transmit mechanical power generated by the wind turbine into electrical power. Wind incident on an airfoil may cause the wind turbine to spin. The mechanical power of the turbine shaft spinning may be converted into electrical power.

In some cases, the force of the wind may cause the wind turbine to spin at relatively high speeds. At these relatively high speeds, the wind turbine may experience adverse effects from an imbalance within the wind turbine that may result in structural vibrations, resonance, speed wobbles, oscillations, vortex shedding, dynamic aero-elasticity, etc. A sustained and/or increasing amplitude of oscillation among the pieces of the wind turbine may result in destruction of the wind turbine. As a result, benefits may be realized by techniques for balancing a wind turbine.

SUMMARY

According to at least one example, wind turbine is described. In some cases, the wind turbine may include a balancing system configured to balance the wind turbine. In one example, a turbine shaft may be configured to transmit mechanical power. In one example, the turbine shaft may transmit mechanical power to an electrical generator and/or alternator. In some cases, the wind turbine may include a support structure. In some cases, a portion of the support structure may couple to the turbine shaft. In some cases, a portion of the support structure may couple to a vane shaft of the wind turbine. The wind turbine may include one or more vane shafts. In one example, a balancing channel (e.g., enclosed balancing channel) or balancing tube may be coupled to the vane shaft. In some cases, the balancing channel may include a hollow chamber. In one example, multiple freely moving objects may be placed within the hollow chamber of the balancing channel.

In some cases, the freely moving objects may include at least one spherical bead. In one example, a diameter of the at least one spherical bead may be less than half an inner diameter of the balancing channel, or less than half an inner diameter of the hollow chamber of the balancing channel.

In some cases, at least a portion of a cross section of the balancing channel may include a circular shape, an oval shape, a rectangular shape, or a square shape, or any combination thereof. In some cases, the shape of the cross section of the balancing channel may be any mechanically feasible polygon.

In one example, the support structure may include one or more support arms. In some cases, at least one of the one or more support arms may extend from the vane shaft to the balancing channel. In some cases, at least one of the one or more support arms extends from the vane shaft to the turbine shaft. In one example, the vane shaft may be coupled to at least one of the one or more support arms.

In some cases, the vane shaft may be configured to rotate about an axis running vertically down a center of the vane shaft. In one example, the vane shaft may be connected to an airfoil. In some cases, the airfoil may be configured to rotate freely about the vertical axis of the vane shaft. In some cases, the wind turbine may include one or more airfoils, where each airfoil connects to its own vane shaft.

In some cases, the support structure may include an upper support structure attached to a top of the vane shaft above the airfoil. In some cases, the balancing channel may be attached to the upper support structure. In one example, the support structure may include a lower support structure attached to a bottom of the vane shaft below the airfoil. In one example, the balancing channel may be attached to the lower support structure. In some cases, the wind turbine may include at least two balancing channels. For example, the wind turbine may include at least a first or upper balancing channel placed above the airfoil and a second or lower balancing channel placed below the airfoil.

In some cases, a radius from the turbine shaft to an edge of the balancing channel is below or equal to a radius from the turbine shaft to the vane shaft. In some cases, a radius from the turbine shaft to an edge of the balancing channel is greater than a radius from the turbine shaft to the vane shaft. In some cases, at least a portion of the support structure extends beyond an outer edge of the balancing channel.

In one example, a turbine shaft may be configured to transmit mechanical power. A support structure may be coupled to the turbine shaft. The support structure may include one or more support arms. A balancing channel (e.g., enclosed balancing channel) or balancing tube may be coupled to at least a portion of the support structure. The balancing channel may include a hollow chamber. Multiple freely moving objects may be placed within the hollow chamber of the balancing channel.

In one example, at least one of the freely moving objects may include a spherical object. In some examples, at least a portion of the balancing channel may connect to the support structure toward a top portion of the wind turbine. Additionally, or alternatively, at least a portion of the balancing channel may connect to the support structure toward a bottom portion of the wind turbine. In some cases, at least a portion of a cross section of the balancing channel comprises a circular portion, an oval portion, a rectangular portion, a triangular portion, a hexagonal portion, an octagonal portion, a square portion, etc. In some examples, at least a portion of a cross section of the balancing channel comprises a top portion, a bottom portion, an inner wall portion toward the turbine shaft, and an outer wall portion toward the peripheral portion of the support structure.

In one example, the support structure may include one or more support arms radiating outward away from the turbine shaft. The balancing channel may connect to at least one of the one or more of the support arms. The wind turbine may include a vane shaft connected to at least one of the one or more support arms. The vane shaft may support one or more airfoils. The vane shaft may allow the airfoil to rotate freely about the vane shaft. In some examples, the balancing channel may connect to the vane shaft.

A method for balancing a wind turbine having a vertical axis is also described. The method may include transmitting, via a turbine shaft, mechanical power to an alternator or generator; supporting, via a support structure, a vane shaft and the turbine shaft; and balancing the wind turbine based at least in part on freely moving objects within a hollow chamber of a balancing channel. In some cases, the support structure may couple the vane shaft to the turbine shaft. In some cases, the balancing channel may be coupled to the vane shaft.

In one example, a turbine shaft to transmit mechanical power may be provided as part of the wind turbine. A balancing channel or balancing channel may be provided that is coupled to a support structure of the wind turbine. The balancing channel may include a hollow chamber. The support structure may be coupled to the turbine shaft. Multiple freely moving objects may be placed within the hollow chamber of the balancing channel.

In one example, a turbine shaft to transmit mechanical power may be provided as part of the wind turbine. A balancing channel may be provided that is coupled to a support structure of the wind turbine. The balancing channel may include a hollow chamber. The support structure may be coupled to the turbine shaft. Multiple freely moving objects may be placed within the hollow chamber of the balancing channel.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
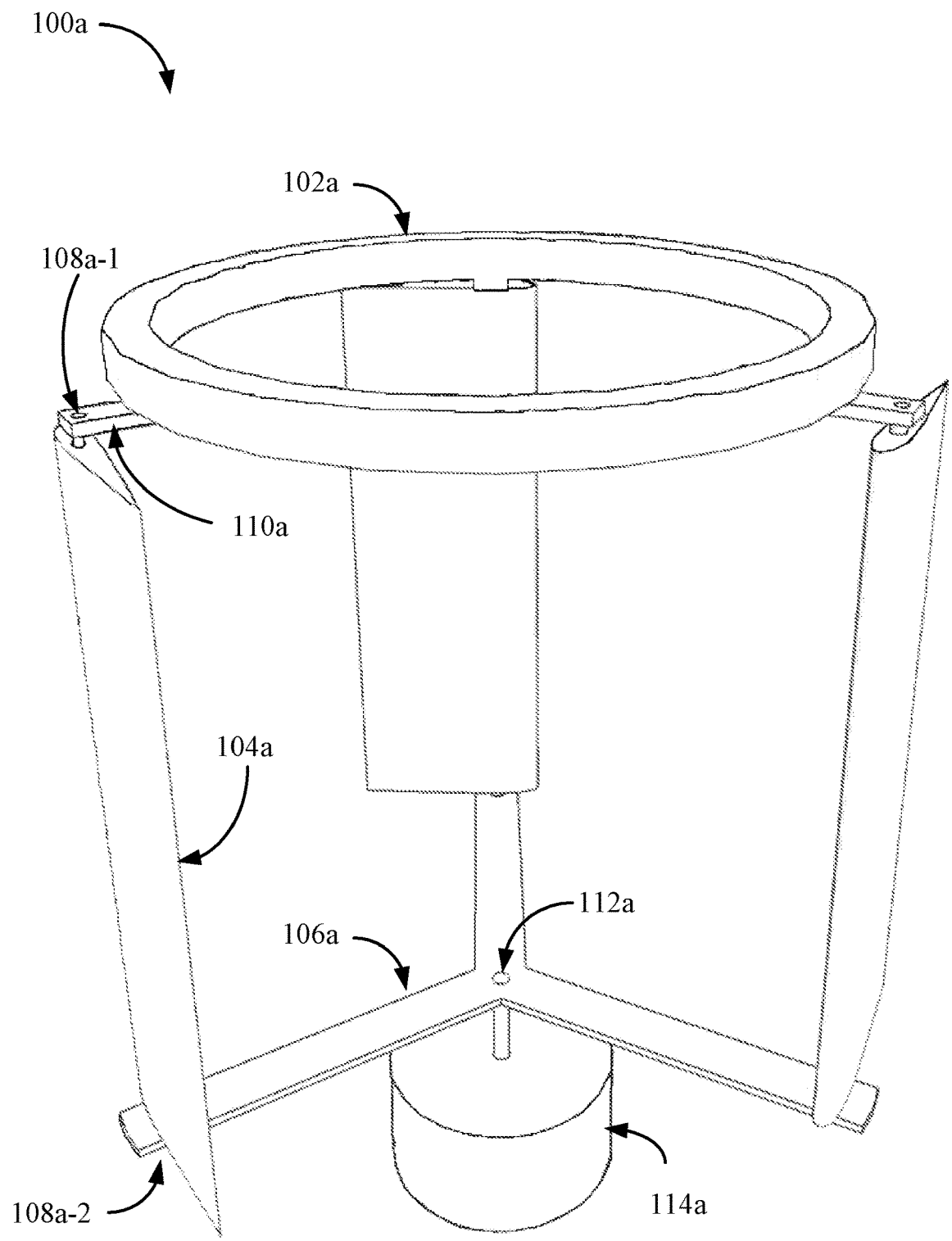
FIG. 1a depicts an exemplary schematic diagram of a wind turbine in which the present techniques may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The techniques described herein relate to balancing a wind turbine. More specifically, the techniques described herein relate to providing a balancing channel (e.g., enclosed balancing channel) on a wind turbine to provide damping forces on the structure of the wind turbine in order to dampen oscillations and/or vibrations in the operation of the wind turbine.

FIG. 1a depicts an exemplary schematic diagram of a wind turbine 100a in which the present techniques may be implemented. As depicted, the wind turbine 100a may include a balancing channel 102a, one or more airfoils 104a, lower support structure 106a, one or more vane shafts including vane shaft 108a, upper support structure 110a, a turbine shaft 112a, and a generator 114a. In some cases, the generator 114a may include an electrical generator and/or alternator. As shown, generator 114a may be positioned below lower support structure 106a. In some cases, turbine shaft 112a may be coupled to generator 114a, and turbine shaft 112a may run from generator 114a to lower support structure 106a. As shown, lower support structure 106a may include at least one support arm that extends outward from turbine shaft 112a. As shown, at least a portion of lower support structure 106a may extend from turbine shaft 112a outward beyond airfoil 104a.

As depicted, wind turbine 100a may include three airfoils including airfoil 104a, and three vane shafts that include vane shaft 108a. As depicted, vane shaft 108a may include an upper vane shaft 108a-1 and lower vane shaft 108a-2. In one example, vane shaft 108a includes a single shaft that runs through an entirety of airfoil 104a, enclosed within airfoil 104a that runs from upper vane shaft 108a-1 to lower vane shaft 108a-2, where the single shaft includes upper vane shaft 108a-1 and lower vane shaft 108a-2. In some cases, vane shaft 108a may include a first shaft (e.g., upper vane shaft 108a-1) that extends out from and into a top portion of airfoil 104a, and a second shaft (e.g., lower vane shaft 108a-2) that extends out from and into a bottom portion of airfoil 104. In some cases, vane shaft 108a may support one or more airfoils including airfoil 104. In some examples, vane shaft 108a may allow an airfoil 104 to rotate freely about the vane shaft 108. In some cases, vane shaft 108a may include at least one of a metal rod, a plastic rod, a wooden rod, a bamboo rod, a fiberglass rod, a carbon fiber rod, or any combination thereof.

As depicted, lower support structure 106a may include one or more support arms that extend outward from turbine shaft 112a. For example, lower support structure 106a may include a support arm that extends from turbine shaft 112-a to lower vane shaft 108a-2, as well as additional support arms that extend from turbine shaft 112a to other vane shafts of wind turbine 100a.

In some cases, turbine shaft 112a is located at a vertical center or relatively near a vertical center of wind turbine 100a. As depicted, upper support structure 110a may connect to upper vane shaft 108a-1 and extend from upper vane shaft 108a-1 to balancing channel 102a. As depicted, wind turbine 100a may include three upper support structures that include upper support structure 110a. In one example, the balancing channel 102a may be configured to provide damping forces on at least a portion of the depicted structure of the wind turbine 100a in order to dampen oscillations and/or vibrations in the operation of the wind turbine 100a.

As depicted, balancing channel 102a may be sized to fit within the circumference of the path of vane shaft 108a when the wind turbine 100a is spinning. As shown, a radius from turbine shaft 112a to lower vane shaft 108a-2 may be greater than a radius from turbine shaft 112a to an edge of balancing channel 102a. For example, with a turbine shaft extending up to or relatively near balancing channel 102a (e.g., see turbine shaft 212 of FIG. 2), a radius from such a turbine shaft to an edge of balancing channel 102a is less than a radius from the turbine shaft to lower vane shaft 108a-2.

In some examples, the turbine shaft 112 may be configured to transmit mechanical power. The mechanical power may be transmitted by the turbine shaft 112 to generator 114a (e.g., electrical generator and/or alternator) configured to convert the transmitted mechanical power into electrical power.

In one example, the balancing channel 102a may include a hollow chamber. In one example, freely moving objects may be situated within the hollow chamber of the balancing channel 102a. In some cases, at least one of the freely moving objects may include one or more spherical objects such as spherical or semi-spherical beads.

Figure 1B:
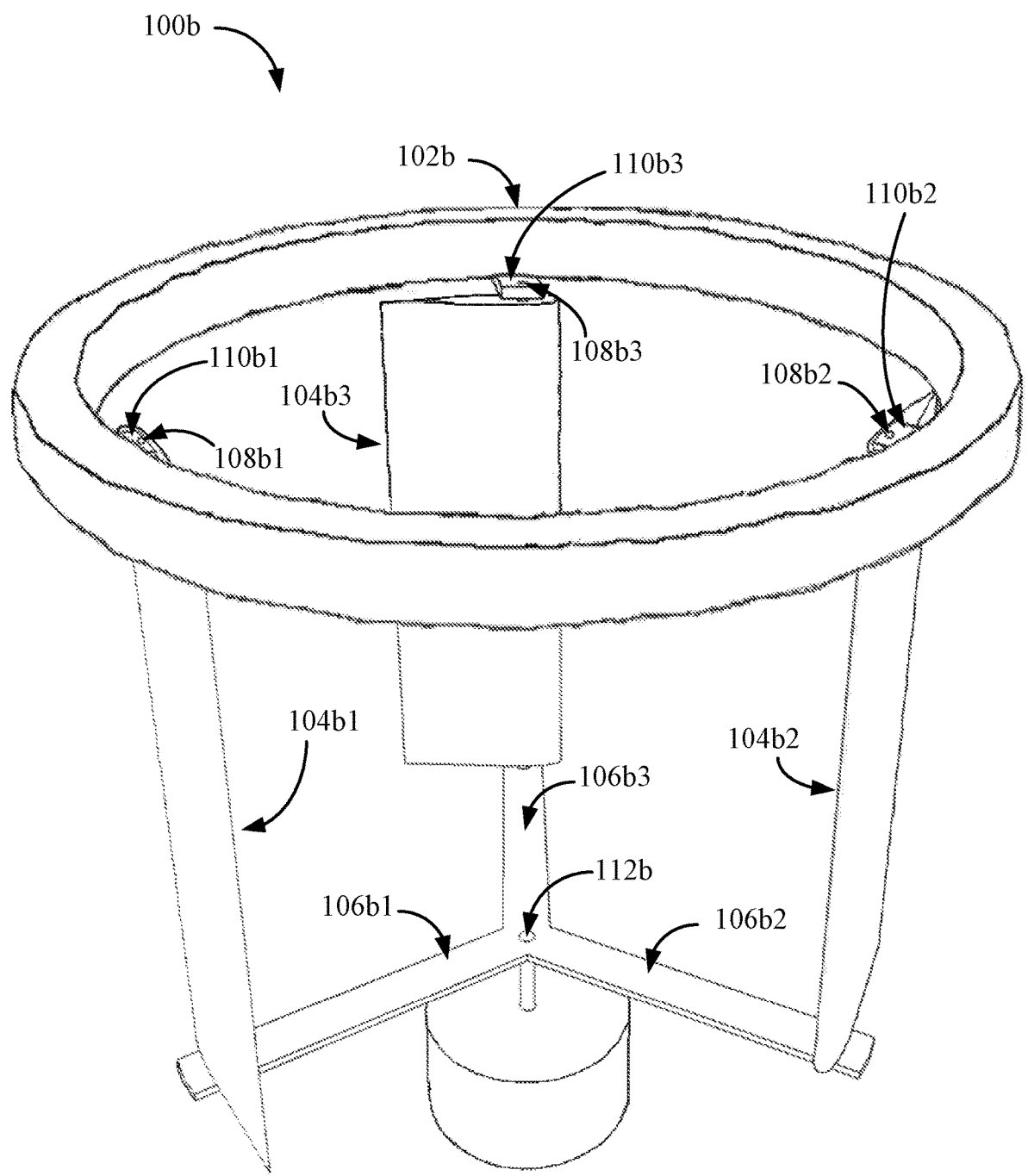
FIG. 1b depicts an exemplary schematic diagram of a wind turbine in which the present techniques may be implemented.

FIG. 1b depicts an exemplary schematic diagram of a wind turbine 100b in which the present techniques may be implemented. As depicted, the wind turbine 100b may include balancing channel 102b, airfoil 104b1, airfoil 104b2, airfoil 104b3, lower support structure (e.g., lower support arm 106b1, lower support arm 106b2, and lower support arm 106b3), vane shafts 108b (e.g., vane shaft 108b1, vane shaft 108b2, and vane shaft 108b3), upper support structure (e.g., upper support arm 110b1, upper support arm 110b2, and upper support arm 110b3), and turbine shaft 112b. In one example, an upper support structure of wind turbine 100b may include at least upper support arm 110b1, upper support arm 110b2, and upper support arm 110b3. In one example, a lower support structure of wind turbine 100b may include at least lower support arm 106b1, lower support arm 106b2, and lower support arm 106b3. In one example, vane shaft 108b1 may be placed at the quarter chord point or relatively near the quarter chord point of airfoil 104b1.

In one example, balancing channel 102b may be sized to fit beyond the circumference of the path of vane shafts 108b when the wind turbine 100b is spinning, extending outward from the center of the wind turbine 100b beyond the distance from the vertical center of the wind turbine 100b to the vane shafts 108b, the vertical center of the wind turbine 100b being in relation to the position of the turbine shaft 112b corresponding to a vertical center or relatively near a vertical center of the balancing channel 102b. As depicted, balancing channel 102b may be sized beyond the circumference of the path of vane shafts 108b when the wind turbine 100b is spinning. As shown, a radius from turbine shaft 112b to vane shaft 108b1 may be less than a radius from turbine shaft 112b to an edge of balancing channel 102b. For example, with a turbine shaft extending up to or relatively near balancing channel 102b (e.g., see turbine shaft 212 of FIG. 2), a radius from such a turbine shaft to an edge of balancing channel 102b is more than a radius from the turbine shaft to vane shaft 108b1. In some cases, at least a portion of balancing channel 102b may extend outward from a vertical center of wind turbine 100b, beyond airfoil 104b1 and vane shaft 108b1. In some cases, a portion of balancing channel 102b may extend outward from a vertical center of wind turbine 100b, beyond upper support arm 110b1.

Figure 1C:
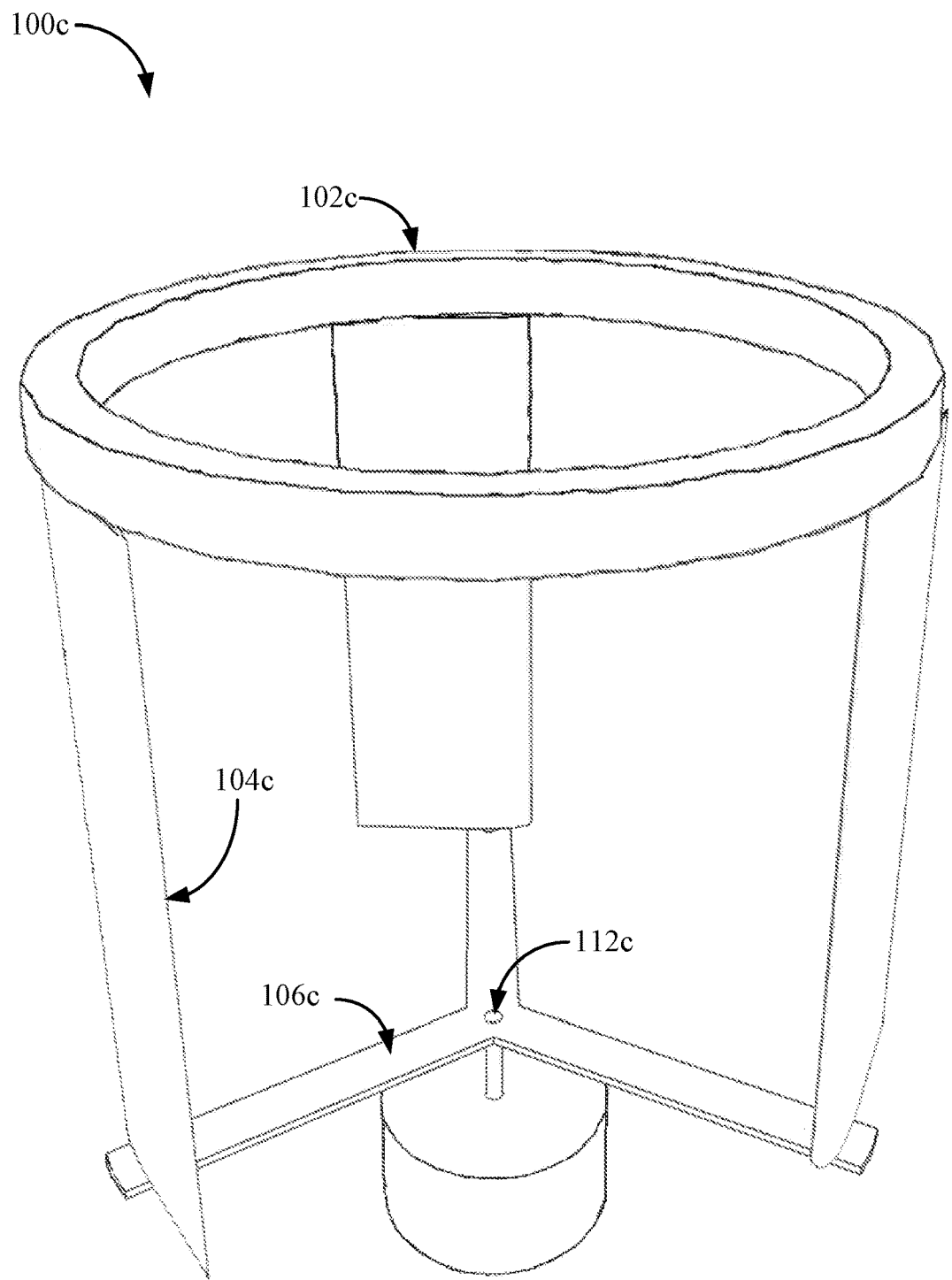
FIG. 1c depicts an exemplary schematic diagram of a wind turbine in which the present techniques may be implemented.

FIG. 1c depicts an exemplary schematic diagram of a wind turbine 100c in which the present techniques may be implemented. As depicted, the wind turbine 100c may include balancing tube 102c, one or more airfoils that include airfoil 104c, a lower support structure 106c, and a turbine shaft 112c. In one example, wind turbine 100c may include an upper support structure between airfoil 104c and balancing tube 102c. In some cases, each airfoil of wind turbine 100c (e.g., airfoil 104c) may include a vane shaft that runs from the upper support structure to lower support structure 106c.

In one example, balancing channel 102c may be sized to fit at or relatively at the circumferential path of airfoil 104c when the wind turbine 100c is spinning, extending outward from the center of the wind turbine 100c to the distance from the vertical center of the wind turbine 100b to the airfoil 104c, where the vertical center of the wind turbine 100c is in relation to the position of the turbine shaft 112c corresponding to a vertical center or relatively near a vertical center of the balancing channel 102c and/or wind turbine 100c. As depicted, balancing channel 102c may be sized at or relatively at the circumference of the path of airfoil 104c when the wind turbine 100c is spinning. As shown, a radius from turbine shaft 112c to airfoil 104c may be at or relatively at the radius from turbine shaft 112c to an edge of balancing channel 102c. For example, with a turbine shaft extending up to or relatively near balancing channel 102c (e.g., see turbine shaft 212 of FIG. 2), a radius from such a turbine shaft to an edge of balancing channel 102c is at or relatively at a radius from the turbine shaft to airfoil 104c.

Figure 2:
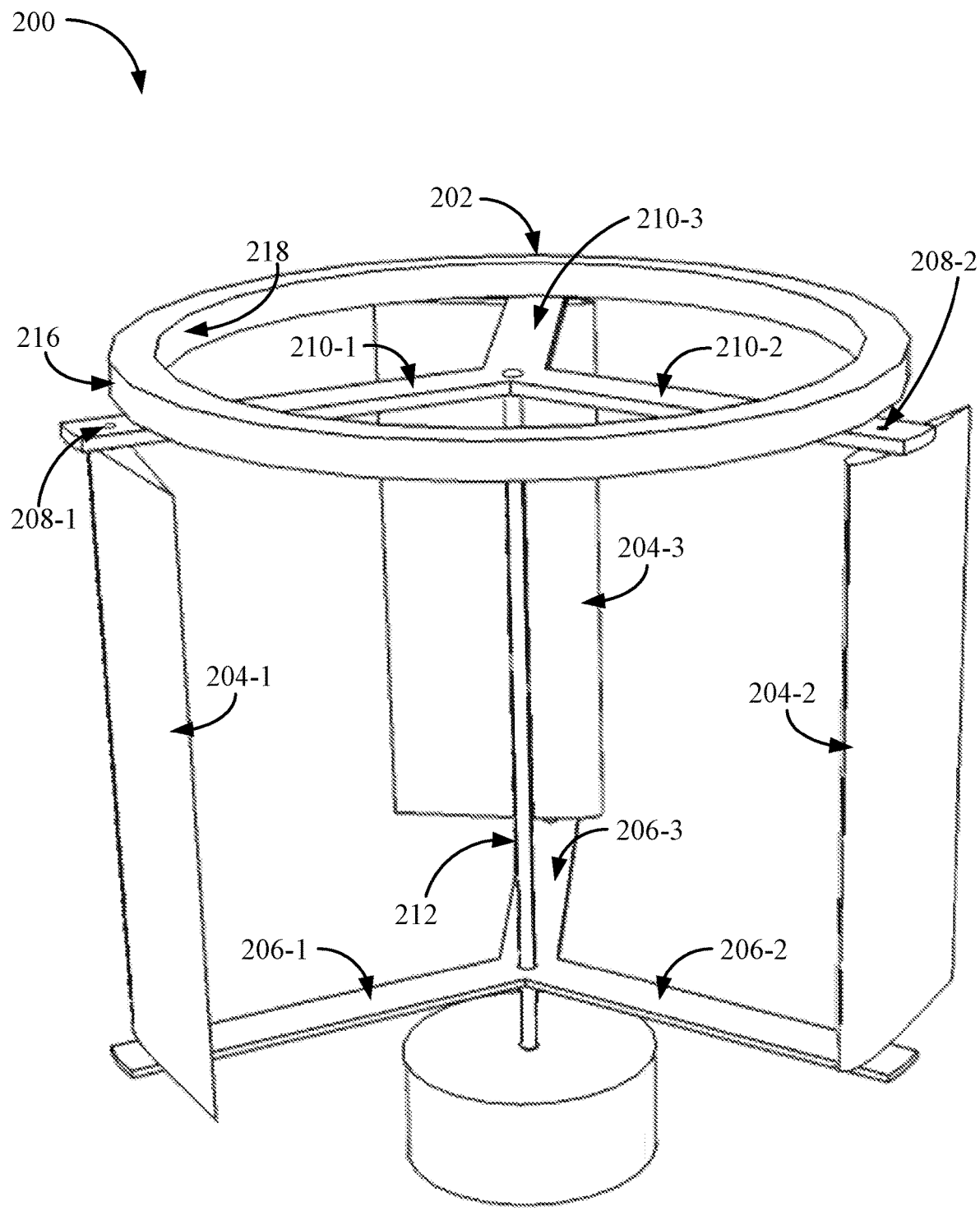
FIG. 2 depicts another exemplary schematic diagram of a wind turbine.

FIG. 2 depicts another exemplary schematic diagram of a wind turbine 200 in which the present techniques may be implemented. The wind turbine 200 may be one example of the wind turbine 100 depicted in FIG. 1a, FIG. 1b, and/or FIG. 1c. As depicted, wind turbine 200 may include balancing channel 202, airfoils 204 (e.g., airfoil 204-1, airfoil 204-2, and airfoil 204-3), lower support structure 206 (e.g., lower support arm 206-1, lower support arm 206-2, and lower support arm 206-3), vane shafts 208 (e.g., vane shaft 208-1, vane shaft 208-2, and vane shaft 208-3), upper support structure 210 (e.g., upper support arm 210-1, upper support arm 210-2, and upper support arm 210-3), and turbine shaft 212. As shown, balancing channel 202 may include an outward surface 216 and an inward surface 218. In one example, balancing channel 202 may be an example of balancing channel 102 from FIGS. 1a, 1b, and/or 1c.

As depicted, the turbine shaft 212 of the wind turbine 200 may extend from a bottom portion of the wind turbine 200 to an upper portion of the wind turbine 200. In some examples, as depicted turbine shaft 212 may be coupled to lower support structure 206 and/or upper support structure 210. In some cases, lower support structure 206 may extend from turbine shaft 212 to one or more vane shafts 208. For example, lower support arm 206-1 may extend from turbine shaft 212 to vane shaft 208-1. In some cases, lower support arm 206-1 may be coupled to vane shaft 208-1 in a manner that allows vane shaft 208-1 to rotate about its own vertical axis. In some cases, airfoil 204-1 may be coupled to vane shaft 208-1 to enable airfoil 204-1 to rotate with vane shaft 208-1. In some cases, upper support structure 210 may extend from turbine shaft 212 to one or more vane shafts 208. For example, upper support arm 210-2 may extend from turbine shaft 212 to vane shaft 208-2.

In some cases, balancing channel 202 may connect to upper support structure 210. For example, at least a first portion of balancing channel 202 may connect to upper support arm 210-1, a second portion to upper support arm 210-2, and/or a third portion to upper support arm 210-3. As shown, upper support structure 210 may be positioned above airfoils 204, and balancing channel 202 positioned above upper support structure 210. As shown, a radius from turbine shaft 212 to vane shaft 208-1 is greater than a radius from turbine shaft 212 to an edge of balancing channel 202. However, in some cases an edge of or any portion of balancing channel 202 may be configured to sit directly above or relatively near vane shaft 208-1, where a radius from turbine shaft 212 to vane shaft 208-1 is the same or relatively the same as a radius from turbine shaft 212 to a portion of balancing channel 202. In some cases, a radius from turbine shaft 212 to vane shaft 208-1 is less than a radius from turbine shaft 212 to an edge of balancing channel 202.

Figure 3:
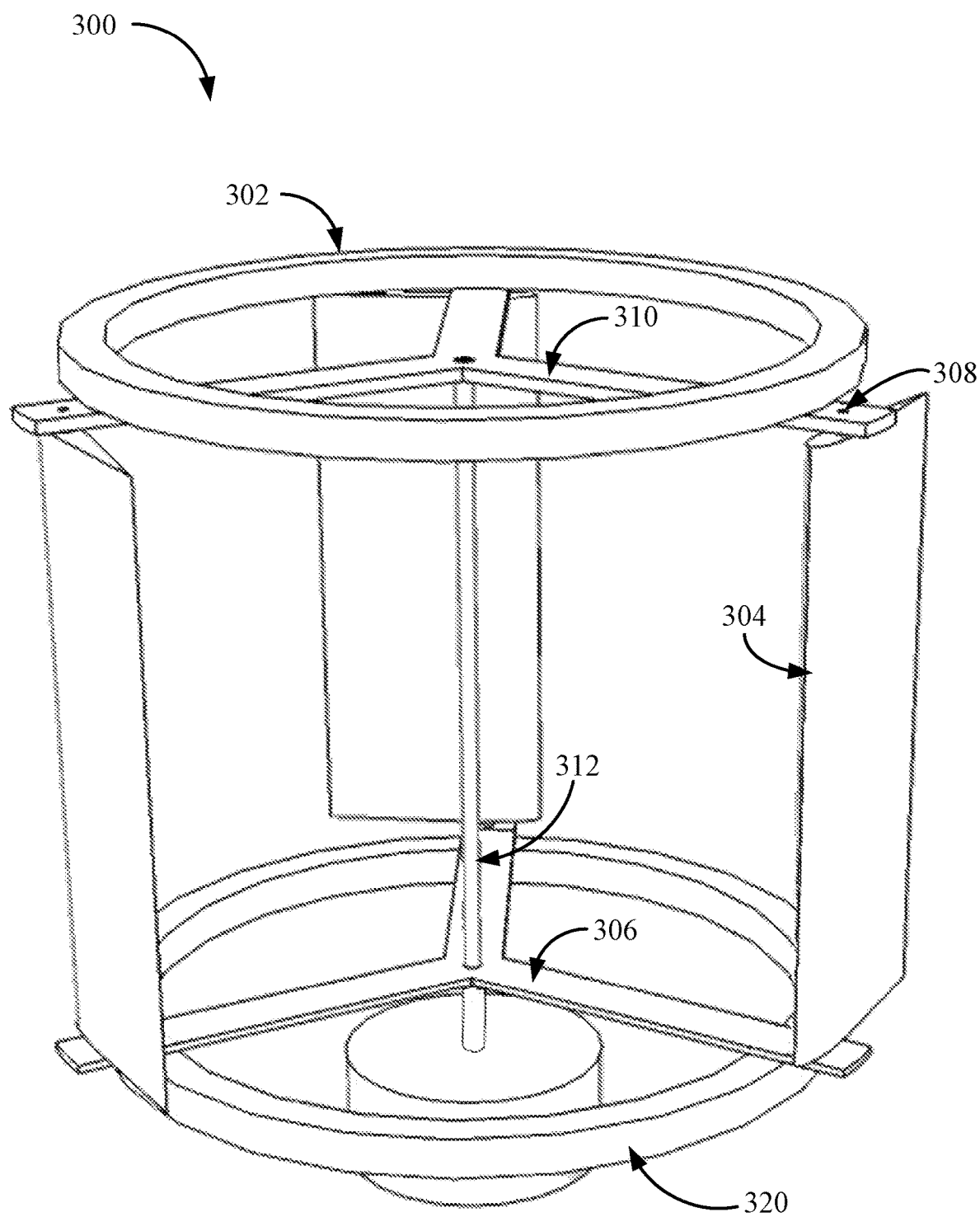
FIG. 3 depicts another exemplary schematic diagram of a wind turbine.

FIG. 3 depicts another exemplary schematic diagram of a wind turbine 300 in which the present techniques may be implemented. The wind turbine 300 may be one example of the wind turbine depicted in FIGS. 1 and/or 2. In some examples, the wind turbine 300 may include an upper balancing channel 302 and a lower balancing channel 320. In some cases, wind turbine 300 may include at least one airfoil 304, at least one lower support arm 306, at least one vane shaft 308, and/or at least one upper support arm 310. In one example, upper balancing channel 302 may be an example of balancing channel 102 from FIGS. 1a, 1b, and/or 1c. In some cases, upper balancing channel 302 may be an example of balancing channel 202 from FIG. 2. In one example, lower balancing channel 320 may be an example of balancing channel 102 from FIGS. 1a, 1b, and/or 1c. In some cases, lower balancing channel 320 may be an example of balancing channel 202 from FIG. 2.

As shown, upper balancing channel 302 may be positioned above upper support arm 310, and upper support arm 310 may be positioned above airfoil 304. In some cases, lower balancing channel 320 may be positioned below lower support arm 306, and lower support arm 306 may be positioned below airfoil 304. As depicted, upper balancing channel 302 may be relatively the same size and/or shape as lower balancing channel 320. In some cases, upper balancing channel 302 may be a different size and/or different shape then lower balancing channel 320. For example, upper balancing channel 302 may have a circular cross-section, while lower balancing channel 320 may have a rectangular cross-section, or vice-versa. In some cases, an edge of upper balancing channel 302, relative to a vertical center of wind turbine 300, may be further from the vertical center of wind turbine 300 than an edge of lower balancing channel 320. For example, an edge of upper balancing channel 302, relative to a vertical center of wind turbine 300, may be further away from the vertical center of wind turbine 300 than the corresponding edge of lower balancing channel 320. Alternatively, an edge (e.g., most-outward edge) of lower balancing channel 320, relative to a vertical center of wind turbine 300, may be further away from the vertical center of wind turbine 300 than an edge (e.g., most-outward edge) of upper balancing channel 302.

Figure 4:
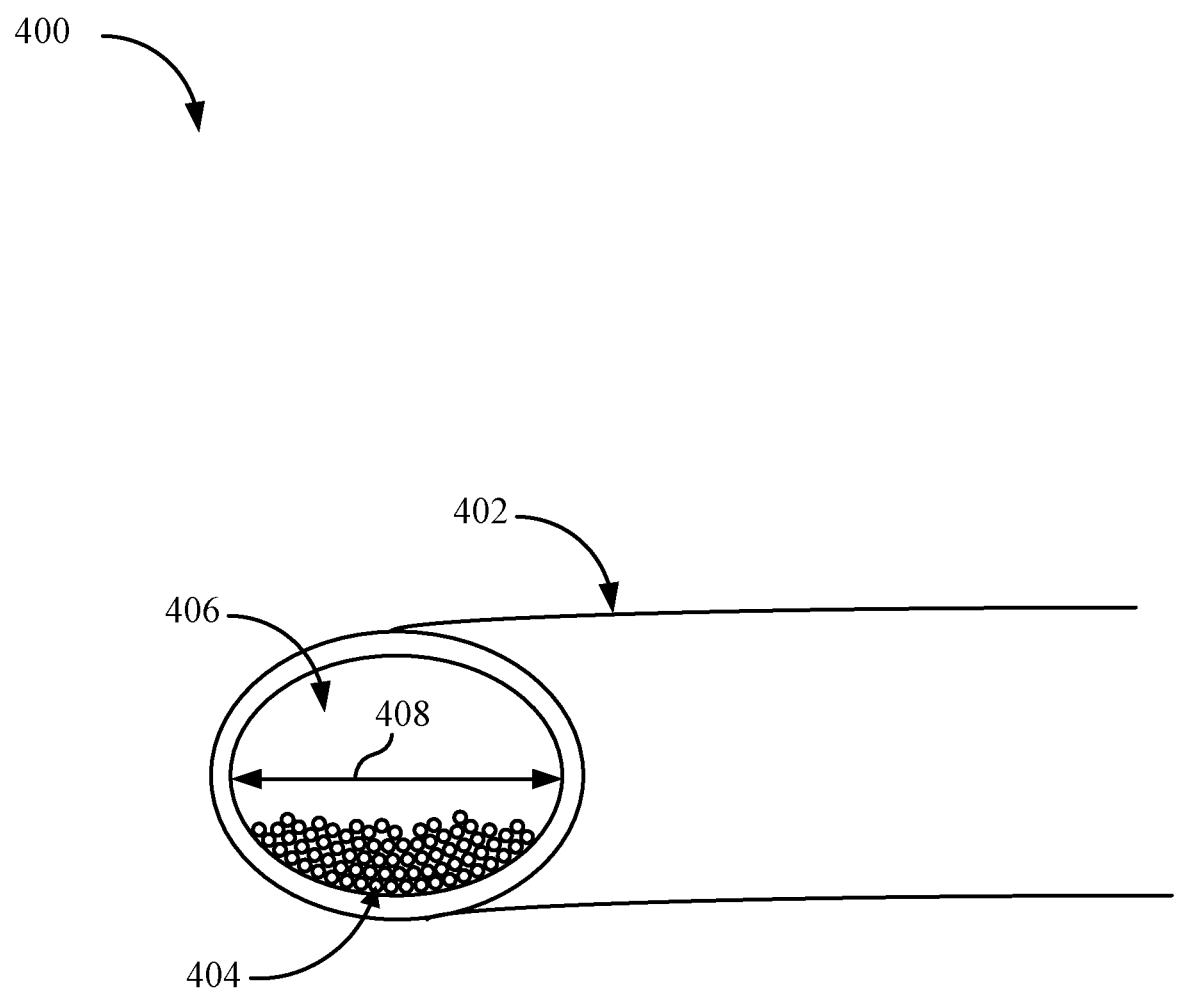
FIG. 4 depicts a cross section of an oval balancing channel.

FIG. 4 depicts a cross section 400 of a balancing channel 402. In some examples, the cross section 400 may include the balancing channel 402, freely moving objects 404, a hollow chamber 406, and an inner diameter 408. The freely moving objects 404 may include one or more spherical objects or spherules (e.g., low-friction beads, etc.). As shown, the freely moving objects 404 may be placed within the hollow chamber 406 of the balancing channel 402. In some cases, a diameter of at least one of the freely moving objects 404 may be less than half inner diameter 408. For example, the inner diameter 408 may measure to be 2 inches. Thus, half of inner diameter 408 at 2 inches would be 1 inch. Accordingly, in some cases a diameter of at least one of the freely moving objects may be less than 1 inch when inner diameter 408 is 2 inches. In some examples, a diameter of at least one of the freely moving objects may be significantly less than half of inner diameter 408. In one example, a diameter of at least one of the freely moving objects may be 0.03125 inches (0.8 mm), 0.01 inches (0.25 mm), or 0.0025 inches (0.06 mm), etc. In one example, a diameter of the freely moving objects may be down to 0.00078 inches (0.02 mm). In some cases, the diameter of each of the freely moving objects 404 may vary within a range from less than half the inner diameter 408 down to 0.00078 inches (0.02 mm). In some cases, inner diameter 408 may be any value in the range from 12 inches (304.8 mm) down to 0.1 inches (2.54 mm).

In some examples, at least a portion of the freely moving objects 404 may include particles of sand (e.g., granular, finely-divided rock and/or mineral particles). In some cases, the freely moving objects 404 may include manufactured particles (e.g., artificial sand, plastic beads, etc.). In some cases, the freely moving objects 404 may include at least one of a smooth object, a jagged object, a rounded object, a non-rounded object, an elongated tube-like object, or flat disc-like object, or any combination thereof.

In some cases, the freely moving objects 404 may include a first moving object and a second moving object, where the first moving object may move in the hollow chamber 406 independent from the second moving object. For example, the first moving object may be of a size that enables the first moving object to move past the second moving object within the hollow chamber 406.

As depicted, in some examples, at least a portion of the cross section 400 of the balancing channel 402 may include a circular portion. For example, at least a portion of the cross section 400 may be in the shape of a circle with a uniform radius, or a closed plane curve every point of which is equidistant from a fixed point within the curve. In some cases, at least a portion of cross section 400 may include an oval or elliptical portion. For example, at least a portion of the cross section 400 may be in the shape of an oval, an elongated circle, or ellipse, with a non-uniform radius relative to a center of the at least portion of the cross section 400 (e.g., center of inner diameter 408, where a volume of hollow chamber 406 above inner diameter 408 is equal to a volume of hollow chamber 406 below inner diameter 408). In one example, at least a portion of the cross section 400 may be a closed plane curve generated by a point so moving that its distance from a fixed point divided by its distance from a fixed line is a positive constant less than 1.

Figure 5:
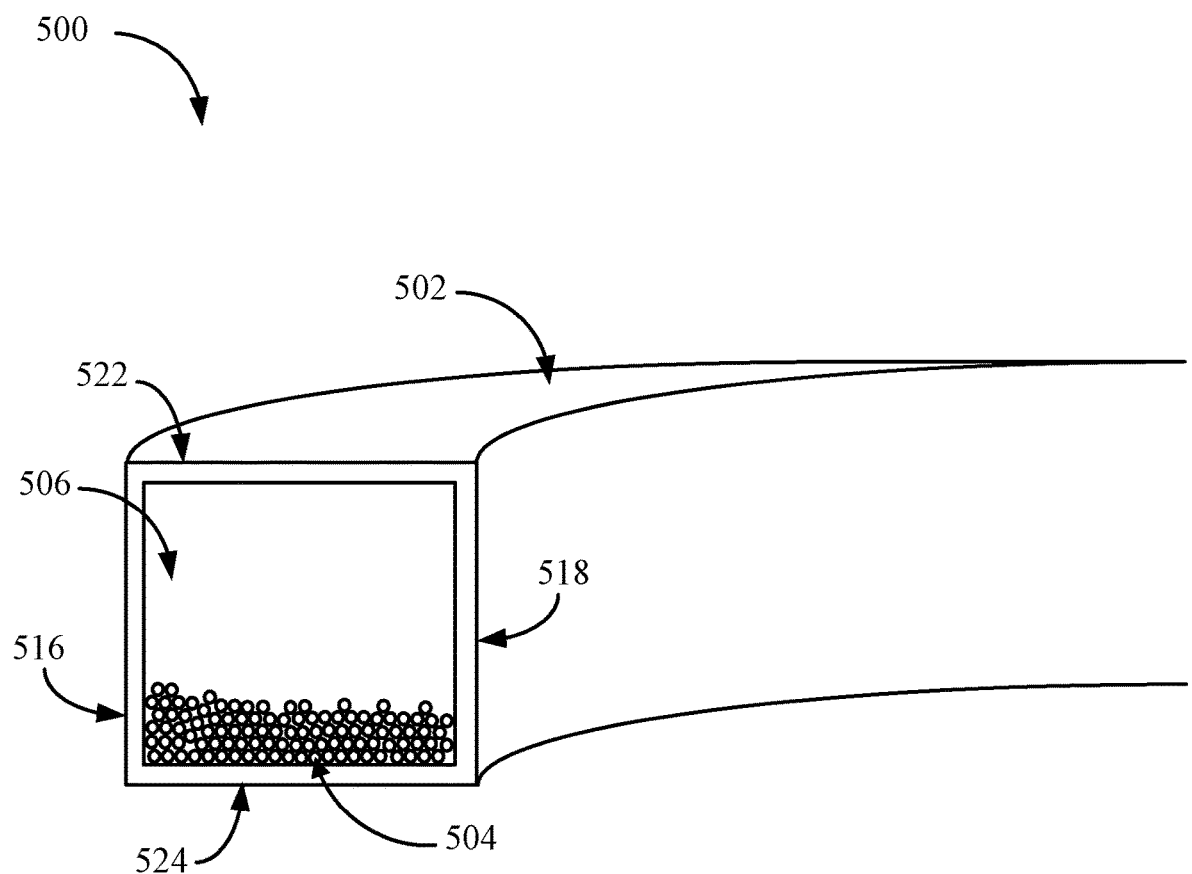
FIG. 5 depicts a cross section of a rectangular balancing channel.

FIG. 5 depicts a cross section 500 of a balancing channel 502. In some cases, the balancing channel 502 may be a four-sided rectangle with at least two sides being the same length or a four-sided square where all four sides are the same length. In some examples, the balancing channel 502 may include freely moving objects 504. The freely moving objects 504 may include one or more spherical objects (e.g., low-friction beads, etc.). In some examples, at least a portion of a cross section 500 of the balancing channel 502 may include an outward surface 516 (e.g., a surface located on a far side, at a peripheral or outer portion of a wind turbine in relation to a vertical center of the wind turbine), an inward surface 518 facing a turbine shaft of the wind turbine, an upper surface 522, and a lower surface 524.

Figure 6:
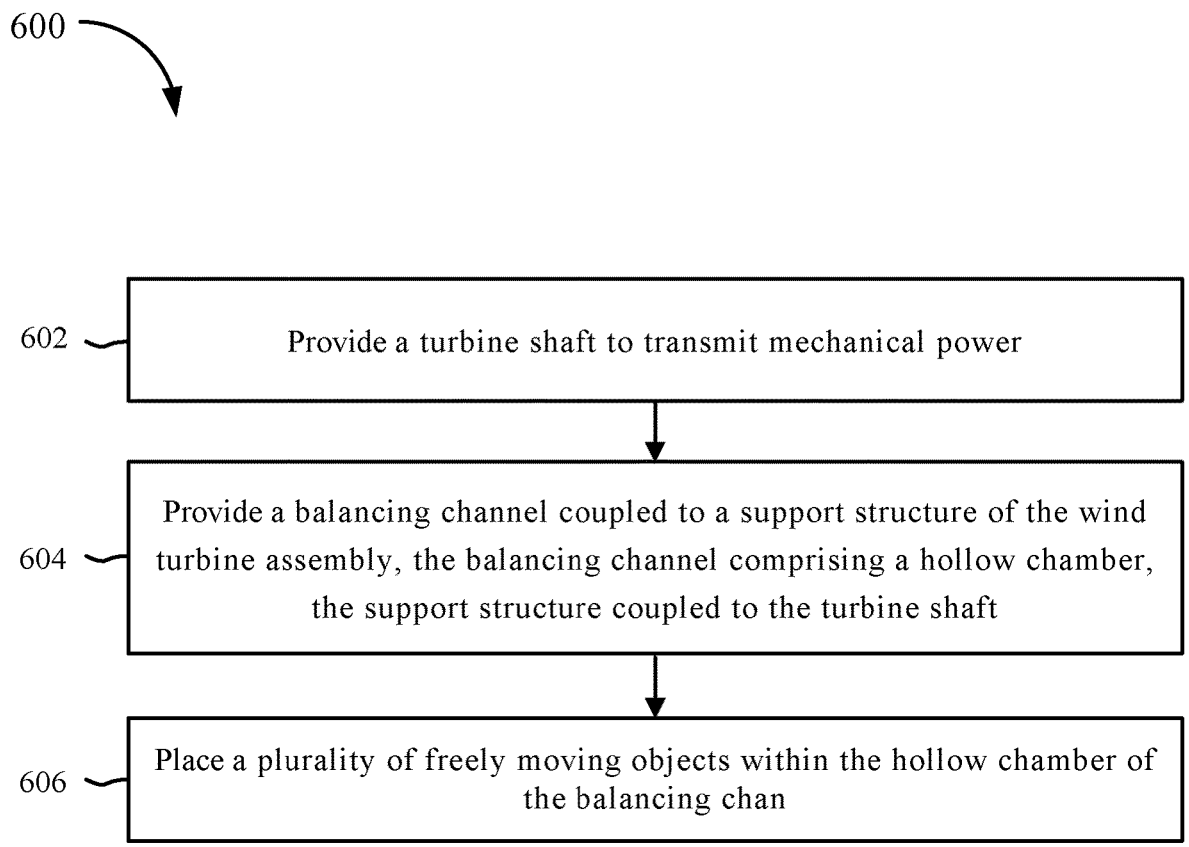
FIG. 6 is a flow diagram illustrating one example of a method for balancing a wind turbine.

FIG. 6 is a flow diagram illustrating one example of a method 600 for balancing a wind turbine. In some configurations, the method 600 may be implemented by the balancing channel illustrated in FIGS. 4 and/or 5.

At 602, method 600 may include transmitting, via a turbine shaft of a wind turbine, mechanical power to an alternator or generator as the wind turbine rotates. In some cases, the wind turbine may be oriented as a vertical wind turbine, where the turbine shaft is oriented vertically.

At 604, method 600 may include supporting, via a support structure, a vane shaft and the turbine shaft, the support structure coupling the vane shaft to the turbine shaft At 606, method 600 may include balancing the wind turbine based at least in part on a plurality of freely moving objects within a hollow chamber of a balancing tube. In some cases, the balancing tube may be coupled to a vane shaft of the wind turbine.

Figure 7A:
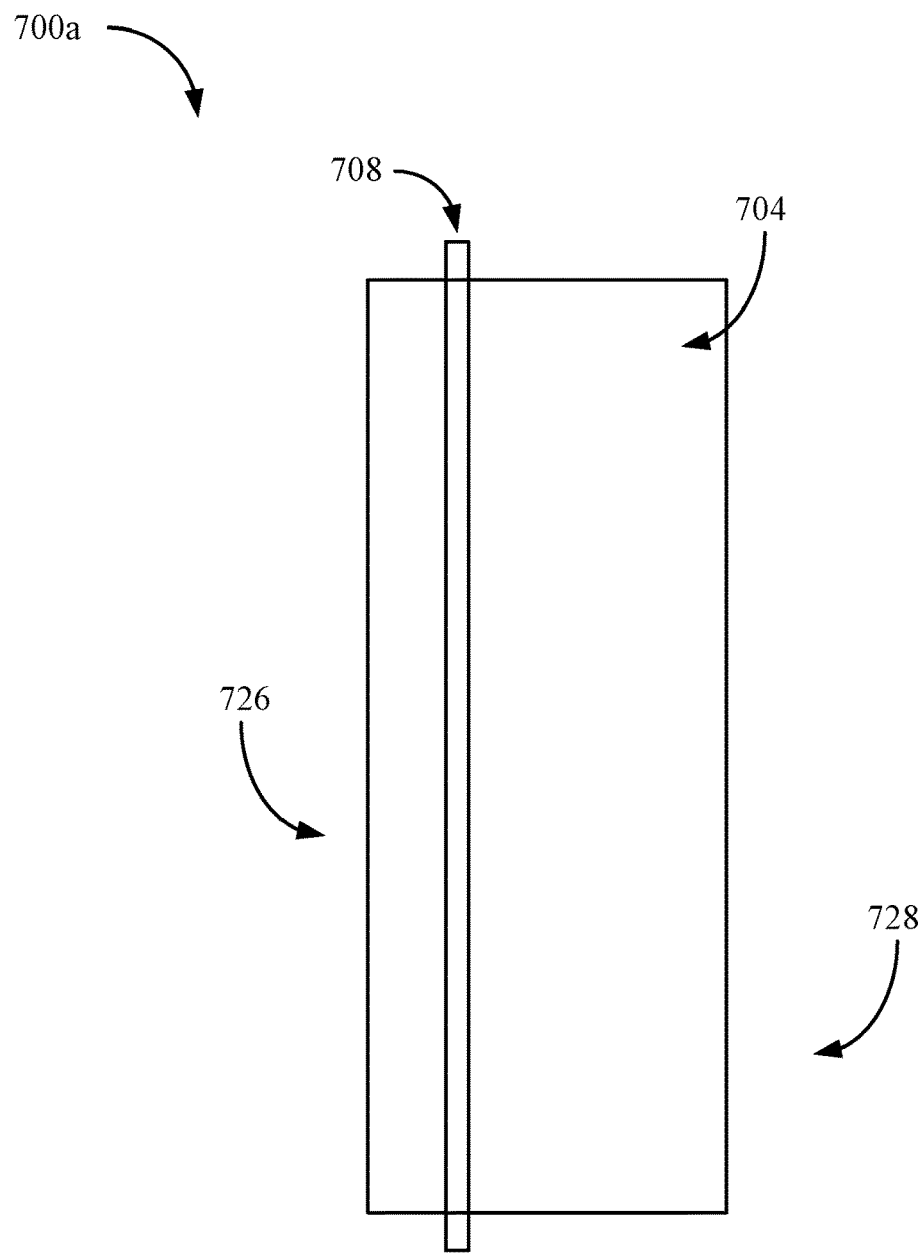
FIG. 7a depicts a side view of a vane shaft in an airfoil.

FIG. 7A depicts a side view 700*a* of a vane shaft 708 in an airfoil 704. As shown, vane shaft 708 may be a single rod running through a length of airfoil 704. As depicted, airfoil 704 may include a leading edge 726 and a trailing edge 728.

Figure 7B:
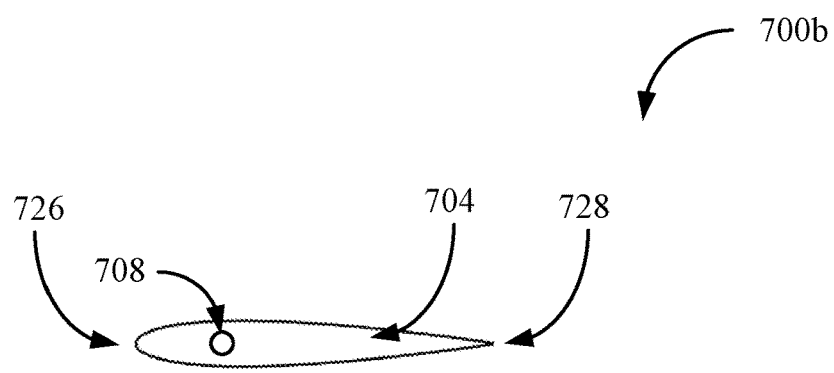
FIG. 7b depicts a top view of a vane shaft in an airfoil.

FIG. 7B depicts a top view 700*b* of vane shaft 708 in airfoil 704. As shown, vane shaft 708 may be positioned at a quarter chord point in airfoil 704 (e.g., one-fourth the distance from leading edge 726 to trailing edge 728).

Figure 8:
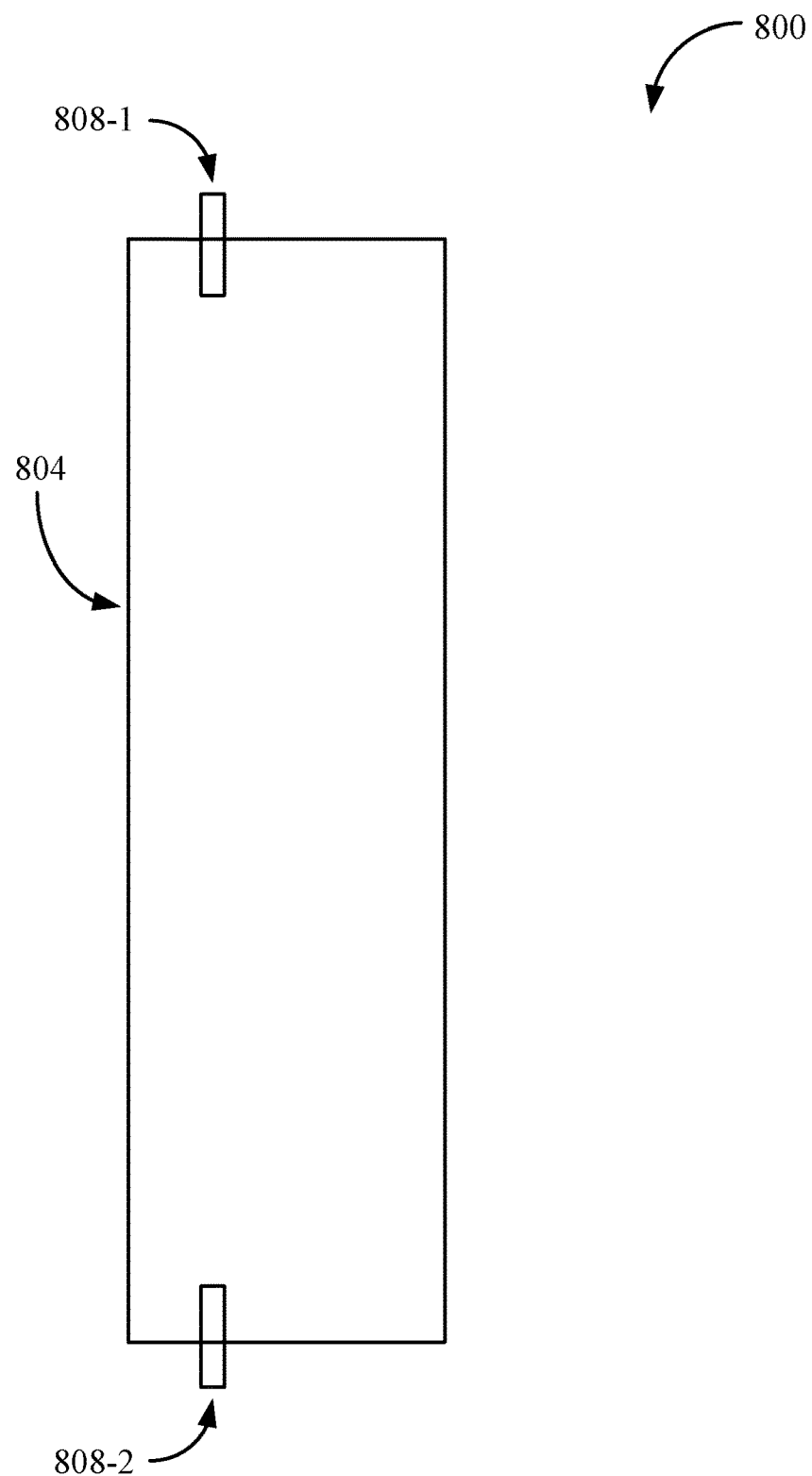
FIG. 8 depicts a side view of a vane shaft in an airfoil.

FIG. 8 depicts a side view 800 of upper vane shaft 808-1 and lower vane shaft 808-2 in airfoil 804. As shown, vane shaft 808-1 may be separate from vane shaft 808-2. As depicted, a first portion of vane shaft 808-1 may insert into a top of airfoil 804 and a second portion of vane shaft 808-1 may extend out from the top of airfoil 804. As shown, a first portion of vane shaft 808-2 may insert into a bottom of airfoil 804 and a second portion of vane shaft 808-2 may extend out from the bottom of airfoil 804. In some cases, vane shaft 808-1 and vane shaft 808-2 may be placed at a quarter chord point of airfoil 804 (e.g., one-fourth the distance from a leading edge of airfoil 804 and a trailing edge of airfoil 804).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, assembly, structural (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present techniques and their practical applications, to thereby enable others skilled in the art to best utilize the present techniques and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A wind turbine having a vertical axis, the wind turbine comprising:
   a turbine shaft to transmit mechanical power;
   a support structure, a portion of the support structure coupled to the turbine shaft;
   a vane shaft coupled to the support structure;
   a balancing tube coupled to the vane shaft, the balancing tube comprising a hollow chamber, wherein the support structure includes one or more support arms, at least one of the one or more support arms extending from the vane shaft to the balancing tube; and
   a plurality of freely moving objects being placed within the hollow chamber of the balancing tube.

2. The wind turbine of claim 1, wherein the plurality of freely moving objects includes at least one spherical bead.

3. The wind turbine of claim 2, wherein a diameter of the at least one spherical bead is less than half an inner diameter of the balancing tube.

4. The wind turbine of claim 1, wherein at least a portion of a cross section of the balancing tube comprises a circular shape, an oval shape, a rectangular shape, or a square shape.

5. The wind turbine of claim 1, wherein at least one of the one or more support arms extends from the vane shaft to the turbine shaft.

6. The wind turbine of claim 1, wherein the vane shaft is coupled to at least one of the one or more support arms, the vane shaft configured to rotate about an axis running vertically down a center of the vane shaft, the vane shaft connected to an airfoil, the airfoil configured to rotate freely about the vertical axis of the vane shaft.

7. The wind turbine of claim 6, wherein the balancing tube includes an upper balancing tube placed above the airfoil and a lower balancing tube placed below the airfoil.

8. The wind turbine of claim 6, wherein the support structure includes an upper support structure attached to a top of the vane shaft above the airfoil.

9. The wind turbine of claim 8, wherein the balancing tube is attached to the upper support structure.

10. The wind turbine of claim 6, wherein the support structure includes a lower support structure attached to a bottom of the vane shaft below the airfoil.

11. The wind turbine of claim 10, wherein the balancing tube is attached to the lower support structure.

12. The wind turbine of claim 1, wherein a radius from the turbine shaft to an edge of the balancing tube is below or equal to a radius from the turbine shaft to the vane shaft.

13. The wind turbine of claim 1, wherein a radius from the turbine shaft to an edge of the balancing tube is greater than a radius from the turbine shaft to the vane shaft.

14. The wind turbine of claim 1, wherein at least a portion of the support structure extends beyond an outer edge of the balancing tube.

15. A method for balancing a wind turbine having a vertical axis, the method comprising:
   transmitting, via a turbine shaft, mechanical power to an alternator or generator;
   supporting, via a support structure, a vane shaft and the turbine shaft, the support structure coupling the vane shaft to the turbine shaft; and balancing the wind turbine based at least in part on a plurality of freely moving objects within a hollow chamber of a balancing tube, the balancing tube being coupled to the vane shaft, wherein the support structure includes one or more support arms, at least one of the one or more support arms extending from the vane shaft to the balancing tube.

\* \* \* \* \*